United States Patent [19]

Silvestrini

[11] 4,308,292

[45] Dec. 29, 1981

[54] METHOD FOR PRODUCING PITTED OLIVES

[76] Inventor: Jesus A. Silvestrini, Mendoza, Argentina

[21] Appl. No.: 224,043

[22] Filed: Jan. 12, 1981

Related U.S. Application Data

[60] Division of Ser. No. 53,829, Jul. 2, 1979, Pat. No. 4,265,169, which is a continuation-in-part of Ser. No. 855,821, Nov. 30, 1977, abandoned, and Ser. No. 27,404, Apr. 5, 1979, abandoned.

[51] Int. Cl.³ .............................................. A23N 4/24
[52] U.S. Cl. .................................... 426/485; 426/282
[58] Field of Search ............... 426/481, 484, 485, 282, 426/102; 99/494, 549, 554, 555

[56] References Cited

U.S. PATENT DOCUMENTS

| | | | |
|---|---|---|---|
| 1,133,054 | 3/1915 | Newcomb | 426/283 |
| 2,283,714 | 5/1942 | Wolff | 99/552 |
| 3,411,556 | 11/1968 | Margaroli | 99/559 |
| 3,552,464 | 1/1971 | Haver | 426/485 |
| 3,962,474 | 6/1976 | Smith | 426/485 |
| 4,006,256 | 2/1977 | Kyros | 426/102 |
| 4,090,439 | 5/1978 | Chall et al. | 99/559 |

Primary Examiner—Joseph M. Golian
Assistant Examiner—George C. Yeung
Attorney, Agent, or Firm—C. Douglas McDonald, Jr.

[57] ABSTRACT

A method and apparatus are disclosed for separating the meat of an olive into two end portions and preparing such an olive for packing. This method and apparatus provides for receiving an olive and producing a cut substantially through the meat in a plane transverse to an axis extending through the ends of the olive, thus defining a pair of olive meat end portions each extending around and adhered to a portion of the olive pit, with the receiving and cut-producing structure being configured to restrain movement of the olive end portion along the axis while permitting movement of the pit of the olive along that axis. Also provided are first and second punches each aligned with and mounted for reciprocation along the axis between two sets of respective positions, in one set the punches being outside the respective ends of the olive meat end portions and in the other set of positions the punches extending at least partially through the olive meat end portions sufficient to dislodge the pit from the end portions. Apparatus is also provided for reciprocatingly moving these punches.

5 Claims, 18 Drawing Figures

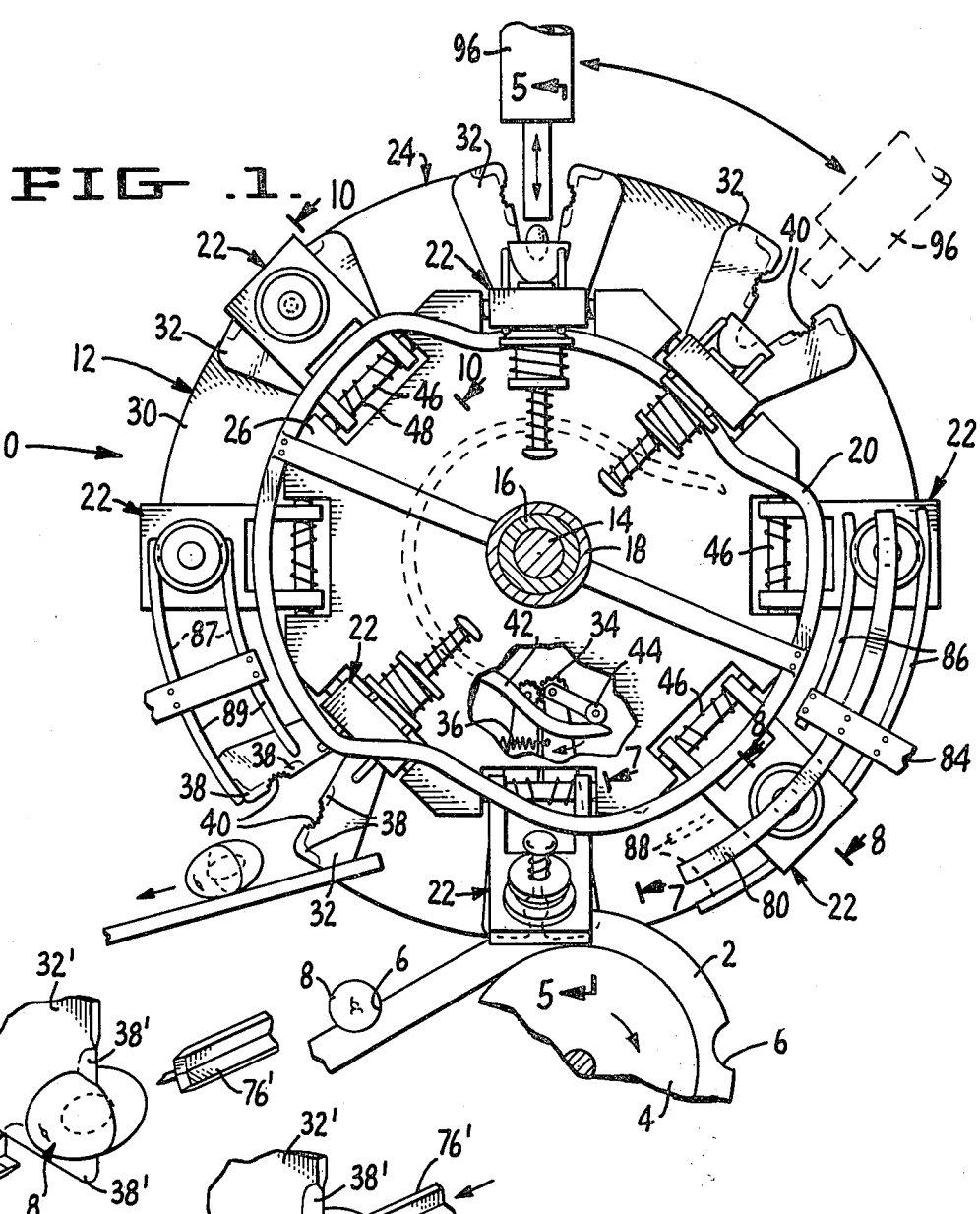

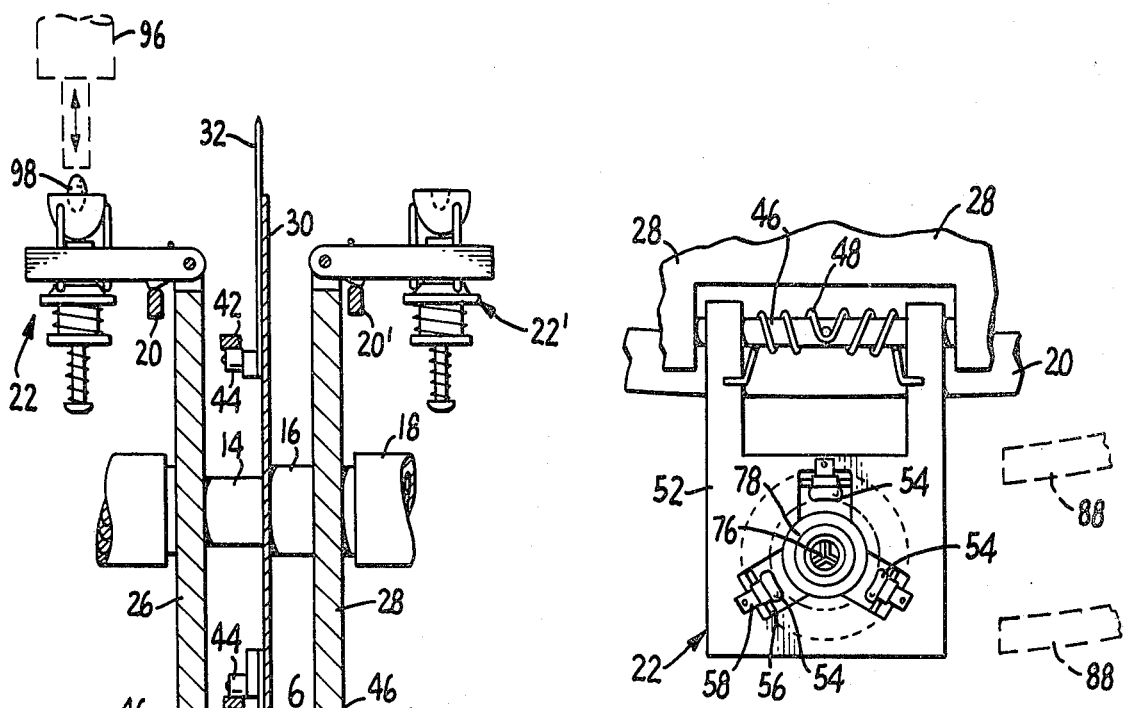
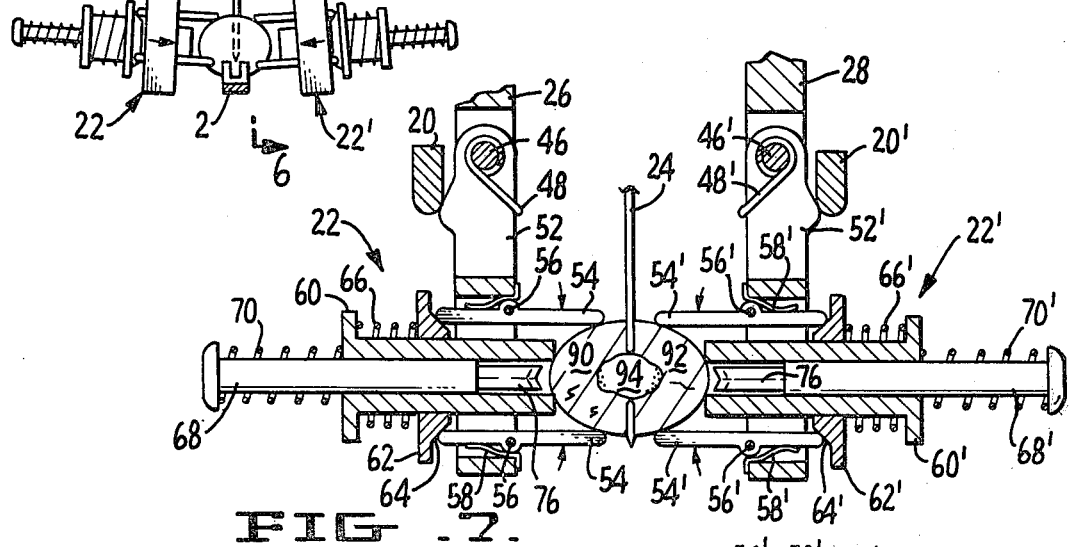
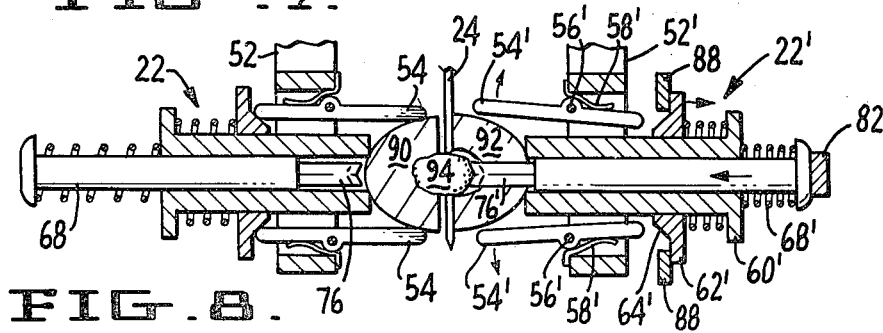
FIG. 5.  FIG. 6.  FIG. 7.  FIG. 8.

METHOD FOR PRODUCING PITTED OLIVES

RELATED APPLICATIONS

This application is a division of my application, Ser. No. 053,829 entitled Improved Method and Apparatus for Producing Pitted Olives, filed on July 2, 1979, now U.S. Pat. No. 4,265,169, which, in turn, was a continuation-in-part of both my application Ser. No. 855,821 entitled IMPROVED PITTED FRUIT AND METHOD AND APPARATUS FOR PRODUCING THE SAME, filed Nov. 30, 1977, now abandoned, and my application Ser. No. 27,404 entitled IMPROVED METHOD AND APPARATUS FOR PRODUCING PITTED OLIVES, filed Apr. 5, 1979, now abandoned.

BACKGROUND OF THE INVENTION

Pit-carrying fruit such as olives or the like customarily are packed commercially either whole, pitted, sliced or chopped. Pitted olives may be packed either with or without some edible foreign material, commonly pimento, stuffed into the cavity left by the pitting. The highest price and thus greatest value to the packer is generally obtained from the pitted and stuffed olives, provided that the pitting and stuffing operation does not damage the olive.

Conventional methods and apparatus for pitting fruit, such as olives, have customarily operated by coring the olive from one end and extracting the pit and core out that end. This operation, while fully functional, has customarily resulted in the loss through coring of a substantial portion of the edible meat of the olive as well as the pit. Since pitted olives or other fruit are sold by the producer by net weight, this loss of edible meat represents a direct loss of product and thus of revenue to the packer. Additionally, these conventional techniques and apparatus have been suitable for producing an olive which includes a void or cavity extending from inside the olive out one end of the olive, such that the olive may only be stuffed from that one end. This has also prevented the creation of two essentially similar end portions which otherwise could be obtained by cutting the olive transversely of an axis extending through the blossom and stem ends of the olive, which could thus provide two equally attractive olive end portions for such uses as salads or cocktails.

For other types of drupes, such as peaches, various types of torque pitting apparatus has been available including Haver et al U.S. Pat. No. 3,552,464 which separates the peach into two end portions by torque pitting while gripping the pit. Such torque pitting apparatus has not been practical on fruits such as olives because the very small size, slick surface and firmness of the olive has made it difficult to grip the olives sufficiently for torque pitting. Additionally, torque pitting to form two end portions tends to tear the interior of the fruit meat, since the pit frequently is of flattened configuration and causes a reaming effect when the meat portions are twisted about an axis through the ends of the fruit.

SUMMARY OF THE INVENTION

In view of the disadvantages of the prior art, it is an object of the present invention to provide a method and apparatus in which an olive is divided on opposite sides of a plane transverse to an axis extending through the stem and blossom ends of the olive into two separate end portions.

It is yet another object of this invention to provide such a method and apparatus in which the loss of the edible olive meat effected by the removal of the pit is substantially less than caused by conventional core pitting techniques. To effect these and other important objects of the invention, a method and apparatus for preparing olives for packing are disclosed in which a cut is produced substantially through the meat of the olive in the plane transverse to an axis extending through the blossom and stem ends of the olive to define a pair of olive meat end portions adhered to the olive pit. The cutting apparatus serves to restrain movement of the meat end portions along the axis while permitting movement of the pit generally along that axis. Also provided are punch apparatus aligned with and mounted for reciprocation along the axis. A first punch is movable between a first position outside the end of one of the olive end portions and a second position extending at least partially through the olive end portion sufficient to dislodge the pit therefrom. A second punch is generally opposed to the first punch and is movable between a first position outside the end of the other olive end portion and a second position extending at least partially through that other end portion sufficiently to dislodge the pit from that end portion. An actuating mechanism is provided for advancing and withdrawing these punches from their engagement with the pit.

BRIEF DESCRIPTION OF THE DRAWINGS

This invention will be described in detail with respect to a preferred embodiment in which:

FIG. 1 is a side elevation of a preferred embodiment of the apparatus of this invention.

FIGS. 2a through 2d are schematic representations of the operations of the pitting punch components of the apparatus of FIG. 1 schematically representing the steps in pitting an olive by the method of this invention;

FIG. 3 is a perspective view, partially in section, of one form of the pitted olive resulting from the use of the apparatus and method of this invention;

FIG. 4 is a perspective view of one end portion of another embodiment of the pitted olive resulting from the use of the method and apparatus of this invention;

FIG. 5 is a sectional view of the apparatus of FIG. 1, taken along line 5—5;

FIG. 6 is a sectional view of the apparatus of FIG. 5 taken along line 6—6;

FIG. 7 is a fragmentary sectional view of the apparatus of FIG. 1 taken along line 7—7;

FIG. 8 is a fragmentary sectional view of the apparatus of FIG. 1 taken along line 8—8;

DESCRIPTION OF A PREFERRED EMBODIMENT

Figure 9:
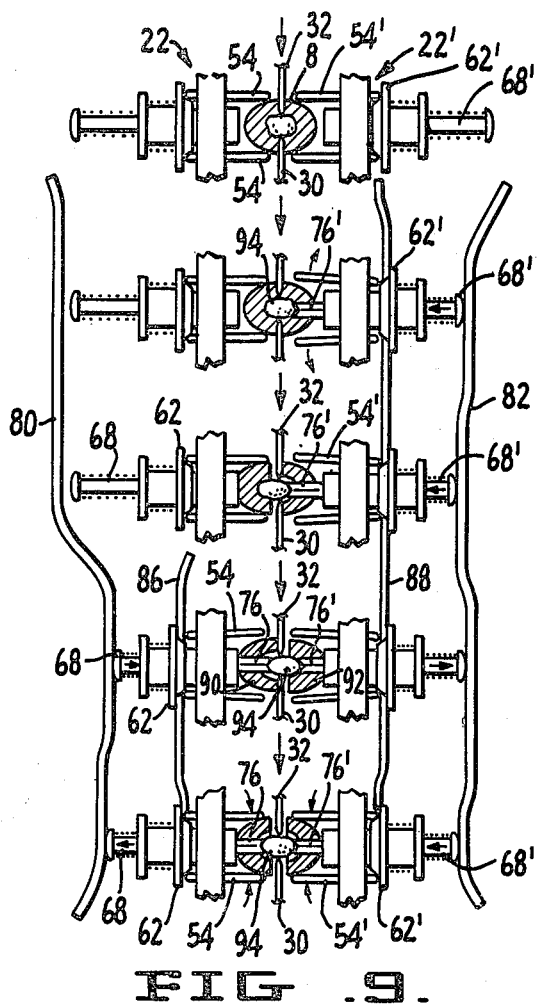
FIG. 9 is a schematic representation of the steps in the actuation and operation of the apparatus of FIG. 1.

A particularly preferred embodiment of the apparatus of this invention, which is suitable for practicing the method of this invention, is illustrated in side elevation in FIG. 1. This apparatus includes a conveyor 2 extending around a pulley 4 driven by suitable and conventional means. This conveyor 2 includes a plurality of U-shaped transversely extending pockets 6, the width of which measured longitudinally of the belt is substantially less than the length of the olives 8, measured longitudinally through the blossom and stem ends, which are fed to it from a hopper (not shown). Thus, the weight of the olives in the hopper against the conveyor belt 2 will serve to urge the olive down into the cups 6 with each olive oriented with its longitudinal axis transverse to the direction of travel of the conveyor 2. The pockets 6 are also dimensioned small enough so that only a single olive may be held in each, so that individual olives may be fed sequentially and in spaced relation to the pitting apparatus.

This pitting apparatus, generally denoted by reference numeral 10, may suitably be in the form of a circular rotating assembly 12 having a plurality of fruit pitting stations spaced about the periphery. The assembly 12 is supported upon a fixed shaft 14, about which is journaled tubular shaft 16 to which the rotating assembly 12 is mounted. A sleeve 18 is journaled about shaft 16 and is fixed against rotation for supporting a three-dimensional cam track 20, which will be described below.

Spaced about the periphery of the rotating assembly 12 are a plurality (eight in this embodiment) of olive pitting stations defined by opposed pairs of olive gripping assemblies 22 adjacent the jaws of the cutting blade assembly 24. This cutting blade assembly 24 is mounted for rotation with the supporting plates 26 and 28 which support the olive gripping heads 22 and 22'. This blade assembly 24 suitably may be in the form of a continuous fixed plate 30 having a plurality of movable jaws 32 and 32' mounted to the fixed plate 30 by pivotal connections 34. Adjacent a pivot 34 and 34' each jaw 32 and 32' is formed with a plurality of gear-like teeth 35 and 35' which mesh so as to cause both jaws 32 and 32' to move pivotally in synchronism with one another. Jaw 32 is urged toward jaw 32' by a suitable biasing spring 36. Thus, the pivotally movable jaws 32 and 32' will be urged toward one another at all times by the spring 36. Each jaw includes sharpened, opposing portions 38 (and 38') extending on either side of a toothed recess 40 (and 40'), which recess is dimensioned such that, when the jaws are closed on one another, the cavity formed by the recess is slightly smaller than the diameter of the pits of the olives to be processed. As shown in FIG. 1 a cam track 32 is provided to cooperate with a cam follower 44 attached to each jaw 32 to effect an opening of each jaw pair against the force of the spring 36 at positions to be described below. This cam track 42 is rigidly mounted and does not rotate with the blade and gripper assembly. This cam track 42 is rigidly mounted and does not rotate with the blade and gripper assembly.

Figure 12:
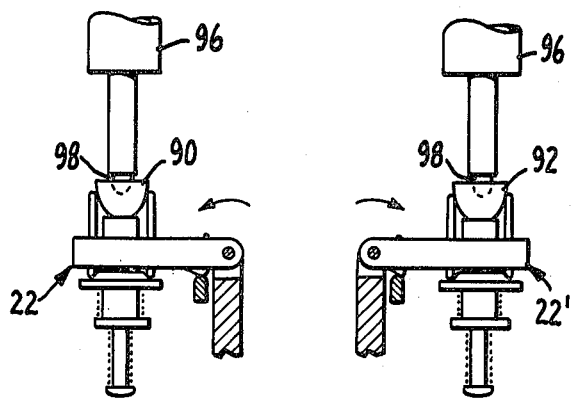
FIG. 12 is a fragmentary sectional view of the upper portion of the apparatus of FIG. 5, including an alternative stuffing mechanism.
Figure 10:
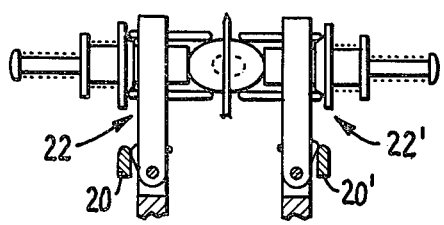
FIG. 10 is a fragmentary sectional view of the apparatus of FIG. 1 taken along line 10—10.
Figure 14:
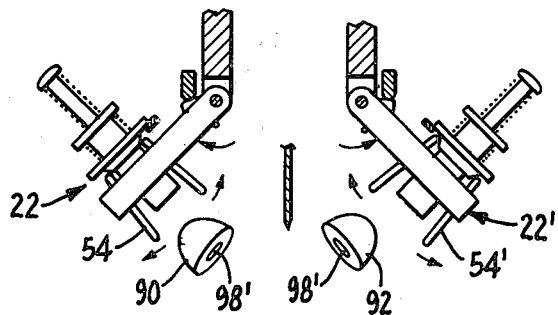
FIG. 14 is a fragmentary view similar to the apparatus of FIG. 11 when used with the stuffing apparatus of FIG. 12.

Gripping head assemblies 22 are pivotally mounted to their respective mounting plates 26 and 28 by pivots 46 and 46' and are biased to pivot to their open positions, illustrated in FIGS. 10, 12 and 14, by torsion springs 48 and 48'. The component parts and general manner of operation of opposed gripper head assemblies 22 and 22' are substantially identical and are correspondingly numbered (e.g. 46 and 46'). Accordingly, the descriptions of the components of gripper heads 22 apply also to the components of gripper heads 22'. Substantially identical sinuous cam tracks 20 adjacent the plates 26 and 28 cooperate with cam followers 50 on each gripping head assembly 22 to overcome the biasing of spring 48 and urge the gripping head assemblies 22 to the closed position illustrated in FIGS. 9 and 10.

As illustrated best in FIGS. 6, 7 and 8, each gripper head assembly includes a housing 52 pivotally attached to the mounting plates 26 and 28 by pivotal connection 46. Pivotally mounted adjacent the outer extremity of each housing are a plurality, suitably three, olive gripper fingers 54, attached to the housing by pivots 56. (In FIGS. 7 and 8 the lower gripper fingers 54 have been illustrated as directly opposing the upper gripper fingers 54 to simplify the illustration and explanation, rather than having them at the 120° angle to one another that is preferred in the apparatus.) Means, such as leaf springs 58, bias the gripper fingers 54 toward the open position illustrated on the right-hand portion of FIG. 8. Also affixed to each housing 52 is a flanged tubular member 60 mounted concentric with an axis about which the gripper fingers 54 are spaced. A disc-like member 62 having a conical surface 64 is slidably mounted over tubular member 60 for movement along that axis. Compression spring 66 biases that member 62 toward the gripper fingers thus urging them toward the closed position illustrated in FIG. 7. Within tubular member 60 and generally concentric with its axis is slidably mounted plunger 68 which is biased outwardly by compression spring 70. Each of these plungers 68 is connected to or formed integrally with a punch member 76, also aligned generally along the axis of the tubular member 60. Thus, each of these punches 76 is mounted for reciprocating movement along the axis of that member 60. Suitably this punch member 76 may have a cross-section generally similar to a three-pointed star with the end of the punch remote from the plunger 68 being sharpened for purposes to be described below.

As shown best in FIGS. 1 and 9, a pair of plunger-actuating cam tracks 80 and 82 are rigidly mounted by means of bracket 84 to the base (not shown) of this apparatus to be held fixed and without rotation. Additionally, adjacent to the cam tracks 80 and 82 are provided two pairs of cooperating gripper-finger cam tracks 86 and 88, respectively, for controlling the opening and closing of the gripper fingers 54 and 54' in the manner to be described below. Two other pair of gripper-finger actuating cam tracks 87 and 89, also mounted to the base of the apparatus for release of the gripper fingers adjacent the discharge of this apparatus, as will be described in detail below.

Adjacent a portion of this pitting apparatus 10 suitably is mounted an olive-stuffing mechanism 94, of conventional and well-known design. This stuffing mechanism 94 is mounted for limited rotational movement with the apparatus 10, as illustrated by the phantom and solid-line representations in FIG. 1, for reasons to be discussed below.

From the foregoing description of the apparatus, the method of operation illustrated in FIGS. 2 and 5 through 14 may now be seen. As the rotating assembly 12, including the blade assembly 30 and the gripper assemblies 22 mounted to their respective plates 26 and 28, are rotated counterclockwise toward the conveyor 2, the engagement by cam follower 44 with cam track 42 effects an opening of the movable jaws 32 and 32'. At the same time, the configuration of the cam tracks 20 permits the gripper heads 22 to pivot back to their open position, pivoted away from the cutting blade jaws. Then, as an olive reaches the peak of the conveyor 2, which is synchronized with the rotation of the assembly 12, the olive is inserted or impaled upon the sharp, closing jaws of the two opposed cutting blades, the movable jaws 32 and 32' being urged toward one another by spring 36. After the olive has been inserted onto the blades, the blades 32 and 32' close completely so that the application of the sharpened cutting edges 38 serves to cut substantially through the meat of the olive in a plane transverse to an axis extending through the blossom and stem ends of the olive, thus defining a pair of olive meat end portions each extending around and adhered to a portion of the pit of the olive. The pit is gripped within the recesses 40 in such a manner that it may slide back and forth along the axis extending through the ends of the olive. At this same time, the configuration of cam track 20 forces the pit-gripping heads 22 to close about and grip the olive end portions generally in the manner illustrated in FIG. 7, with the conical surface member 62 urging the fingers 54 into gripping contact with the olive. Thus, the olive meat end portions 90 and 92 (FIG. 7) are supported on opposite sides of the cutting blades 30 and 32 with the pit 94 extending through the plane of those blades.

With both the olive end portions 90 and 92 gripped by their respective sets of gripper fingers 54 and the pit 94 slidably gripped within the recesses 40 of the cutting blades 30 and 32, the rotation of the assembly 10 brings the pit-gripping assemblies 22 to the position illustrated as the first position counter-clockwise from the bottom dead-center position in FIG. 1. This rotational movement brings member 62' into engagement with the cam tracks 88 and brings plunger 68' into engagement with cam track 82. For purposes of clarity of explanation, the advancement of the gripper heads 22 between a position just past bottom dead center and the 3 o'clock position is illustrated in a linear manner in FIG. 9, these views being generally from the axis of the apparatus looking out. Thus the topmost view in FIG. 9 corresponds to the configuration illustrated in FIG. 7 and taken along section line 7—7 in FIG. 1. The gripper head configuration illustrated in FIG. 9 as the third station from the top of the drawing, in the center of that figure, corresponds to the configuration of the gripper head assembly illustrated in the sectional view of FIG. 8, taken along section line 8—8 in FIG. 1. The configuration of the gripper head assembly illustrated in the lowermost station in FIG. 9 is that of the gripper head assembly when it reaches the 3 o'clock position shown on FIG. 1. By these illustrations in FIG. 9 the operation of the cam tracks and cam followers can be more clearly seen.

As the rotating assembly of the apparatus 10 moves from its bottom dead-center position in FIG. 1 counter-clockwise to the 3 o'clock position, the various components of the gripper heads are actuated in a manner illustrated in FIG. 9. Initially, the olive is supported both by its engagement with the cutting blade assembly 30 and by the resilient gripping of the olive meat end portions by the fingers 54 and 54'. In this position the plungers 68 and 68' and thus the punches 76 and 76' are both retracted and spaced away from the ends of the olive, as shown in the fragmentary schematic view of FIG. 2A.

Rotation of the apparatus, from the position illustrated at the top of the sequential position drawing of FIG. 9 to that of the next lower position there illustrated brings the disc member 62' into engagement with cam track 88 and brings plunger 68' into engagement with cam track 82. These engagements thus effect the axial movement of the disc member 62' outwardly, away from the olive 8, and axial movement of the plunger 68' inwardly of the olive. Thus, the disc member 62' is lifted away from engagement with gripping fingers 54', permitting them to release their gripping engagement on the olive meat end portion. The axially inward movement of the plunger 68' drives the sharpened punch 76' through the end of the olive meat end portion to engage the pit 94 of the olive.

While the pit 94 is slidably held within the recesses 40 and 40' of the cutting blades the generally planar surfaces of these blades facing the olive meat end portions prevent any such axial movement of the right-hand (in FIG. 9) olive meat end portion toward the left. Continued rotation of the apparatus brings it to the configuration illustrated in the center position in FIG. 9, which is also that illustrated in section in FIG. 8 and in the schematic representation of FIG. 2B. At this position the punch 76' has advanced beyond its position of initial engagement with the pit 94 and has forced that pit, along with the left-hand olive meat end portion, to the left, thus breaking the pit free from the right-hand olive meat end portion which is restrained by its engagement against one side of the blades 30 and 32. The movement of the punch 76' through the right-hand olive meat end portion 92 also impales that portion 92 upon the punch 76', thus providing support for that end portion despite the release of the gripper fingers 54'.

Further rotation of the apparatus moves it from the configuration illustrated in the center step of FIG. 9 to that shown fourth from the top in which cam track 82 has permitted plunger 68 and thus punch 76' to retract partially while still retaining the right-hand olive meat end portion 92 impaled thereupon. This continued rotation also brings plunger 68 into engagement with cam track 80, driving the plunger 68 toward the right (in FIG. 9) and thus driving punch 76 into the left-hand olive meat end portion 90. As the punch 76 is driven into the olive, the disc member 62 engages cam track 86, which lifts that member 62 out of engagement with the gripper fingers 54, permitting the biasing springs 58 to effect the release of those fingers 54 upon the olive meat end portion 90. The full advancement of the punch 76 along the olive axis engages the pit 94 and drives it to the left, while the meat end portion 90 is restrained from such movement by its engagement against the side of the blades 30 and 32. Thus, the full advancement of the punch 76 forces the pit 94 free from the left-hand olive meat end portion 90, while it is still being slidably held within the recess 40 of the cutting blades 30 and 32, as also illustrated in FIG. 2C.

The apparatus continues to rotate to the 3 o'clock position shown in FIG. 1 and illustrated as the lowermost position in FIG. 9. During this movement the configuration of cam track 82 again advances the right-hand plunger 68' and punch 76' slightly at the same time that left-hand plunger 68 and punch 76 are slightly retracted, thus enabling the punch 76' to push the olive pit 94 back to a center position generally free of engagement with either olive meat end portion. At generally the same time the configuration of cam tracks 86 and 88 permits the disc members 62 and 62' once again to move axially toward the blade, once again engaging the gripper fingers 54 and 54' and thus supporting the olive meat end portions 90 and 92 by the engagement with those gripper fingers. At this point, with the olive meat end portions still impaled upon the punches 76 and 76' and the pit 94 loosely gripped in the recesses 40 and 40' of the jaws 32 and 32' as shown schematically in FIG. 2D, continued rotation of the apparatus moves the discs 62 and 62' and the plungers 68 and 68' free of their cooperating cam tracks. Thus the compression springs 66 and 70 (and correspondingly 66' and 70') cause the plungers 68 and 68' and punches 76 and 76' to retract fully out of the olive meat end portions while the gripper fingers 54 and 54' support those end portions free of the olive pit 94.

As the apparatus 12 continues its rotation about shaft 14 beyond the 3 o'clock position, the configuration of cam tracks 20 permits the gripper heads 22 (and 22') to pivot open and away from the blade assembly and the pit, which is still lightly gripped in the recesses 40 of the blades. Thus are provided the two olive meat end portions each extending from the cut through the center to one of the ends of the olive and each being free from the pit. This continued rotation then brings the cam follower 44 actuating the movable jaws 32 and 32' into engagement with the upper end of the cam track 42. This engagement then causes the movable jaws 32 and 32' to swing open, as illustrated in the upper right-hand portion of the apparatus of FIG. 1, releasing the grip on the pit and permitting it to fall away and be discarded, while the pitted olive end portions 90 and 92 remain gripped by their respective gripper assemblies 22 and 22'.

If it is desired to provide only pitted olive end portions without stuffing any edible foreign material, such as pimiento, almonds or cucumber portions into the cavity formed by the removal of the pit, the remaining steps of the process could be performed as described below, or, alternatively, the apparatus could be modified to release the pitted olive halves at this point. However, when it is desired to stuff the olives with some edible foreign material, that function may take place in the sequence of events immediately following the release of the pit as previously described. The stuffer 96, which may be of conventional design, is mounted for limited oscillating movement with the rotating assembly 12, so that it may follow along with the movement of the gripper heads 22 as they move from the position in FIG. 1 before top dead center up to that top dead center position, while effecting the stuffing. The remaining steps illustrated in FIG. 1 and in FIGS. 10 and 11 relate to a new and different form of stuffing the olives in which the end portions 90 and 92 are stuffed with a single, substantially rigid, elongated item of edible foreign material, such as a small cucumber portion or a nut meat or almond or other suitable material. In this event, as is illustrated at the top of FIG. 5, the elongated foreign material 98 is inserted into the cavity left by removal of the pit 94 from one of the olive end portions. Then, as the rotating assembly continues its movement counterclockwise from dead center (FIG. 1), the cam tracks 20 urge the gripper assemblies 22 to their closed position, thus bringing the end portions back together in a gap between the spaced blades 30 and 32, as illustrated in FIG. 10. This action, accompanied by the urging of the resilient rings 78 engaging the curved ends of the olive end portions, urges the two olive end portions back into intimate contact, thus "re-assembling" the olive about the edible foreign material in the position shown in FIG. 1 just after top dead center.

As the apparatus 10 continues its rotation to the 9 o'clock position shown in FIG. 1, the disc members 62 and 62' engage cam tracks 90 and 92 which once again force the disc members 62 and 62' axially away from the olive, thus permitting the gripper fingers 54 and 54' to release their grip upon the olive portions. As rotation continues with the grip of the fingers 54 and 54' released, the configuration of cam tracks 20 again causes the gripper heads 22 and 22' to be swung away from the cutting blade assembly 24 at the position shown in FIG. 1 just before bottom dead center. This effects the release of the "re-assembled" stuffed olive for discharge and subsequent packing, as illustrated in FIG. 11.

Figure 13:
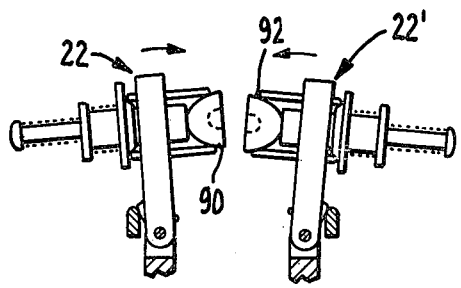
FIG. 13 is a fragmentary sectional view of the apparatus of FIG. 10 adjusted for use with the stuffing apparatus of FIG. 12.
Figure 11:
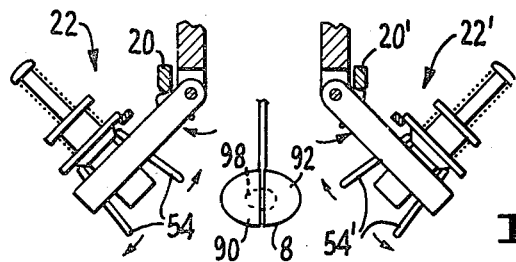
FIG. 11 is a fragmentary sectional view of the apparatus of FIG. 1 taken along line 11—11.
Figure 15:
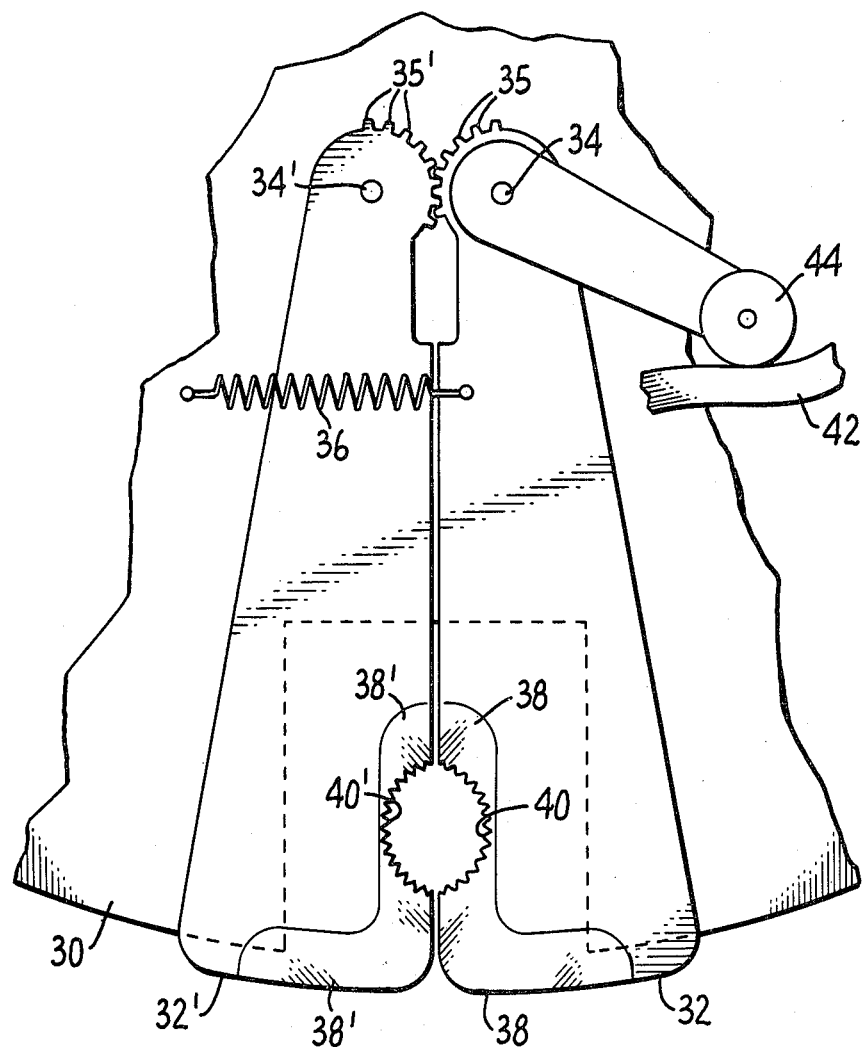
FIG. 15 is a fragmentary side view of one of the pairs of the olive cutting and gripping jaws of the apparatus of FIG. 1.

If, instead of stuffing the pitted olive with a single elongated piece of edible foreign material, it is desired to stuff the two end portions separately, such as with pimiento, the steps illustrated at the top of FIG. 5 and in FIGS. 10 and 11 would be replaced with those illustrated in FIGS. 12, 13 and 14 with corresponding modification to the apparatus. In such an event, it is then necessary to include two stuffing mechanisms 96, one aligned with each of the open gripper assemblies 22 and 22' and thus with each of the olive end portions 90 and 92. These stuffing mechanisms 96 thus insert appropriate edible foreign material into the olive halves 90 and 92 as illustrated in FIG. 12. The remaining steps, illustrated in FIGS. 13 and 14, may suitably correspond functionally to those illustrated in FIGS. 10 and 11, with the release of the olive-meat end portions providing two independently-stuffed halves.

From all the foregoing, it may be seen that this invention provides not only a new food product and a novel method of producing it, but also a new apparatus suitable for practicing that method and producing that product. It is to be noted that the foregoing description is directed to a particularly preferred embodiment of the invention, but is not to be considered limitative of the principles of the invention. Since numerous variations and modifications, all within the scope of the invention, will readily occur to those skilled in the art, the scope of the invention is to be determined solely by the claims appended hereto.

What is claimed is:

1. A method of separating the meat of an olive into two end portions and preparing such an olive for packing, comprising the steps of
    aligning the olive so that an axis extending through the stem and blossom ends of the olive is generally transverse to a set of cutting blades;
    applying said cutting blades to said olive to engage the olive and cut substantially through the meat of the olive around the pit thereof and transversely of said axis, whereby the cut defines two opposed end portions of the olive meat, each extending around a portion of the pit of the olive;
    inserting first punch means through the end of one of said meat end portions remote from said cutting blade and engaging said pit and forcing said pit from said one end portion while said one end portion is restrained from movement parallel to the movement of said first punch means by the engagement of said one end portion against said cutting blades;

withdrawing said first punch means from engagement with said pit;

inserting second punch means through the end of the other said meat end portion remote from said cutting blade and engaging said pit thereby forcing said pit from said other end portion while said other end portion is restrained from movement parallel to the movement of said second punch means toward said one end portion by the engagement of said other end portion against said cutting blades; and withdrawing said second punch means from engagement with said pit and discharging said pit from its proximity to said end portions while supporting said end portions, whereby may be obtained two olive meat end portions each extending from the transverse cut to one of the ends of the olive and each being free of the pit.

2. The method of claim 1 further comprising the step of separating said olive meat end portions a predetermined distance from one another while continuing to support them, whereby the two separate olive meat end portions may be presented for subsequent individual preparation.

3. The method of claim 2 further comprising the step of inserting an edible foreign material into the cavity left in the olive by the removal of said pit.

4. The method of claim 3 wherein said edible foreign material is inserted separately into each said olive meat end portion.

5. The method of claim 3 wherein said edible foreign material is inserted into the cavity of one of said end portions from the opening of said cavity adjacent said transverse cut, and wherein said edible foreign material is of sufficient size to extend outwardly of said cavity adjacent said transverse cut and along said axis, and wherein said method comprises the additional step of bringing said end portions together with the surfaces of said end portions formed by said transverse cut being adjacent one another, whereby the edible foreign material may project into both olive meat end portions.

* * * * *